(12) United States Patent
Budinsky et al.

(10) Patent No.: US 9,715,494 B1
(45) Date of Patent: Jul. 25, 2017

(54) CONTEXTUALLY AND TONALLY ENHANCED CHANNEL MESSAGING

(71) Applicant: International Business Machines Corporation, Armonk, NY (US)

(72) Inventors: Frank J. Budinsky, Ontario (CA); Briana Frank, Raleigh, NC (US); Anish Ramasekar, Austin, TX (US); Lin Sun, Cary, NC (US); David C. Tropeano, Greensburg, PA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/335,667

(22) Filed: Oct. 27, 2016

(51) Int. Cl.
*G06F 17/27* (2006.01)
*H04L 12/18* (2006.01)
*H04L 12/58* (2006.01)
*H04L 29/08* (2006.01)

(52) U.S. Cl.
CPC ........ *G06F 17/2785* (2013.01); *G06F 17/274* (2013.01); *H04L 12/1813* (2013.01); *H04L 12/583* (2013.01); *H04L 12/588* (2013.01); *H04L 12/5835* (2013.01); *H04L 12/5855* (2013.01); *H04L 51/046* (2013.01); *H04L 51/063* (2013.01); *H04L 51/066* (2013.01); *H04L 51/14* (2013.01); *H04L 51/16* (2013.01); *H04L 51/32* (2013.01); *H04L 67/34* (2013.01)

(58) Field of Classification Search
CPC ............... H04L 12/1813; H04L 12/583; H04L 12/5835; H04L 12/5855; H04L 12/588; G06F 17/274; G06F 17/2785
See application file for complete search history.

(56) References Cited

U.S. PATENT DOCUMENTS

| | | | | |
|---|---|---|---|---|
| 6,381,241 B1* | 4/2002 | Ghirnikar | ............. | H04L 1/1809 340/7.2 |
| 8,495,660 B1* | 7/2013 | Hernacki | ............. | G06Q 10/107 719/313 |
| 8,930,380 B1* | 1/2015 | Saurabh | ................ | G06F 17/271 707/755 |
| 2002/0023018 A1* | 2/2002 | Kleinbaum | ............ | G06Q 30/02 705/26.4 |
| 2003/0023875 A1* | 1/2003 | Hursey | ................ | G06Q 10/107 726/4 |

(Continued)

*Primary Examiner* — Eric Yen
(74) *Attorney, Agent, or Firm* — Gard Law Firm, PLLC; Rakesh Garg; David Zwick

(57) ABSTRACT

A message being constructed for posting on a messaging platform is analyzed to extract a set of message characteristics. A past period is computed for a channel on the messaging platform. A set of channel characteristics is extracted from a past period data posted in the channel during the past period. When a threshold degree of match exists between the set of message characteristics and the set of channel characteristics, a characteristic is determined that is different in the message characteristics and the channel characteristics, and which is desirable in the channel. A recommendation is constructed to include (i) a channel identifier of the channel to suggest posting the message in the channel, and (ii) a change to the message according to the corresponding characteristic in the set of channel characteristics, wherein the change to the message increases a degree of acceptability of the message in the channel.

20 Claims, 6 Drawing Sheets

(56) References Cited

U.S. PATENT DOCUMENTS

| | | | |
|---|---|---|---|
| 2003/0145052 A1* | 7/2003 | Watanabe | H04L 12/1813 709/204 |
| 2007/0156832 A1* | 7/2007 | Daniels-Farrar | G06Q 10/107 709/207 |
| 2008/0147487 A1* | 6/2008 | Hirshberg | G06Q 30/02 705/14.53 |
| 2009/0063481 A1* | 3/2009 | Faus | G06F 17/2705 |
| 2009/0280460 A1* | 11/2009 | Yaskin | G09B 5/12 434/307 R |
| 2010/0077029 A1* | 3/2010 | Shook | H04L 12/1831 709/204 |
| 2010/0162135 A1* | 6/2010 | Wanas | G06Q 10/10 715/753 |
| 2010/0205176 A1* | 8/2010 | Ji | G06K 9/00704 707/737 |
| 2010/0205539 A1* | 8/2010 | Gestsson | G06Q 10/107 715/752 |
| 2011/0078588 A1* | 3/2011 | Klemm | G06Q 10/10 715/753 |
| 2011/0179114 A1* | 7/2011 | Dilip | G06F 17/30867 709/204 |
| 2011/0302103 A1* | 12/2011 | Carmel | G06Q 30/0282 705/347 |
| 2012/0084364 A1* | 4/2012 | Sivavakeesar | H04L 12/1818 709/205 |
| 2012/0109754 A1* | 5/2012 | Mei | G06Q 30/0267 705/14.64 |
| 2012/0290446 A1* | 11/2012 | England | G06Q 30/0282 705/27.1 |
| 2013/0024784 A1* | 1/2013 | Lifton | G06Q 50/01 715/753 |
| 2013/0151443 A1* | 6/2013 | Kyaw | G06N 5/022 706/12 |
| 2013/0325992 A1* | 12/2013 | McGann | H04L 51/046 709/206 |
| 2014/0082182 A1* | 3/2014 | Doan | H04L 43/08 709/224 |
| 2014/0095635 A1* | 4/2014 | Yoshimoto | H04L 51/02 709/206 |
| 2014/0201296 A1* | 7/2014 | Patfield | H04L 51/04 709/206 |
| 2014/0337012 A1* | 11/2014 | Bastide | G06F 17/24 704/9 |
| 2015/0074265 A1* | 3/2015 | Ando | H04L 67/02 709/224 |
| 2015/0193889 A1 | 7/2015 | Garg et al. | |
| 2016/0019402 A1 | 1/2016 | Khandelwal | |
| 2016/0134579 A1 | 5/2016 | Buddenbaum et al. | |
| 2016/0154889 A1* | 6/2016 | Allen | H04L 51/02 707/728 |
| 2016/0182410 A1* | 6/2016 | Janakiraman | G06F 17/2785 709/206 |
| 2016/0352664 A1* | 12/2016 | Braines | H04L 51/10 |

\* cited by examiner

CONTEXTUALLY AND TONALLY ENHANCED CHANNEL MESSAGING

TECHNICAL FIELD

The present invention relates generally to a method, system, and computer program product for improving the acceptability of a message in a messaging environment. More particularly, the present invention relates to a method, system, and computer program product for contextually and tonally enhanced channel messaging.

BACKGROUND

Hereinafter, a textual message that is electronically posted from or on behalf of a user, in a messaging platform, for distribution to one or more other users of the messaging platform is interchangeably referred to as simply a "message" unless expressly disambiguated where used. A message includes textual data and can optionally include additional data in other forms, such as image data, audio content, video content, multimedia content, and the like.

A messaging platform is a system to facilitate the communication of a message from one user of the platform to one or more other users of the platform. A messaging channel is interchangeably referred to as a "channel" herein. A channel is an organization of messages in the messaging platform according to one or more of message characteristics. Some non-limiting examples of message characteristics include a topic related to a message, a target user or user-group towards whom the message is directed, a reason for the message or a relationship of the message with a subject-matter (i.e., a context), a sentiment expressed in the message, a linguistic tone or styling of the message, and many others.

Some non-limiting examples of message characteristics usable to create and/or manage a channel include a topic, a target user or user-group, and a geographical region. For example, a channel may be for discussing a particular product (an example of a topic) and therefore may include messages related to that topic. Another example channel may be for having conversations with a selected group of users—the conversation being related to an arbitrary set of topics, or some selected topic or topics—and therefore include messages to and from users in that group. Another example channel may be for geography-specific topics and therefore include messages pertaining to those topics. Another example channel may be for users from a geographical region and therefore include messages to and from those users.

SUMMARY

The illustrative embodiments provide a method, system, and computer program product. An embodiment includes a method that analyzes a message to extract a set of message characteristics, the message being constructed for posting on a messaging platform. The embodiment computes, for a channel on the messaging platform, a past period. The embodiment extracts, from a past period data posted in the channel during the past period, a set of channel characteristics. The embodiment determines, responsive to a threshold degree of match existing between the set of message characteristics and the set of channel characteristics, a characteristic that is different in the set of message characteristics from a corresponding characteristic in the set of channel characteristics, the corresponding characteristic in the set of channel characteristics being desirable in the channel. The embodiment constructs a recommendation comprising (i) a channel identifier of the channel to suggest posting the message in the channel, and (ii) a change to the message according to the corresponding characteristic in the set of channel characteristics, wherein the change to the message increases a degree of acceptability of the message in the channel.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
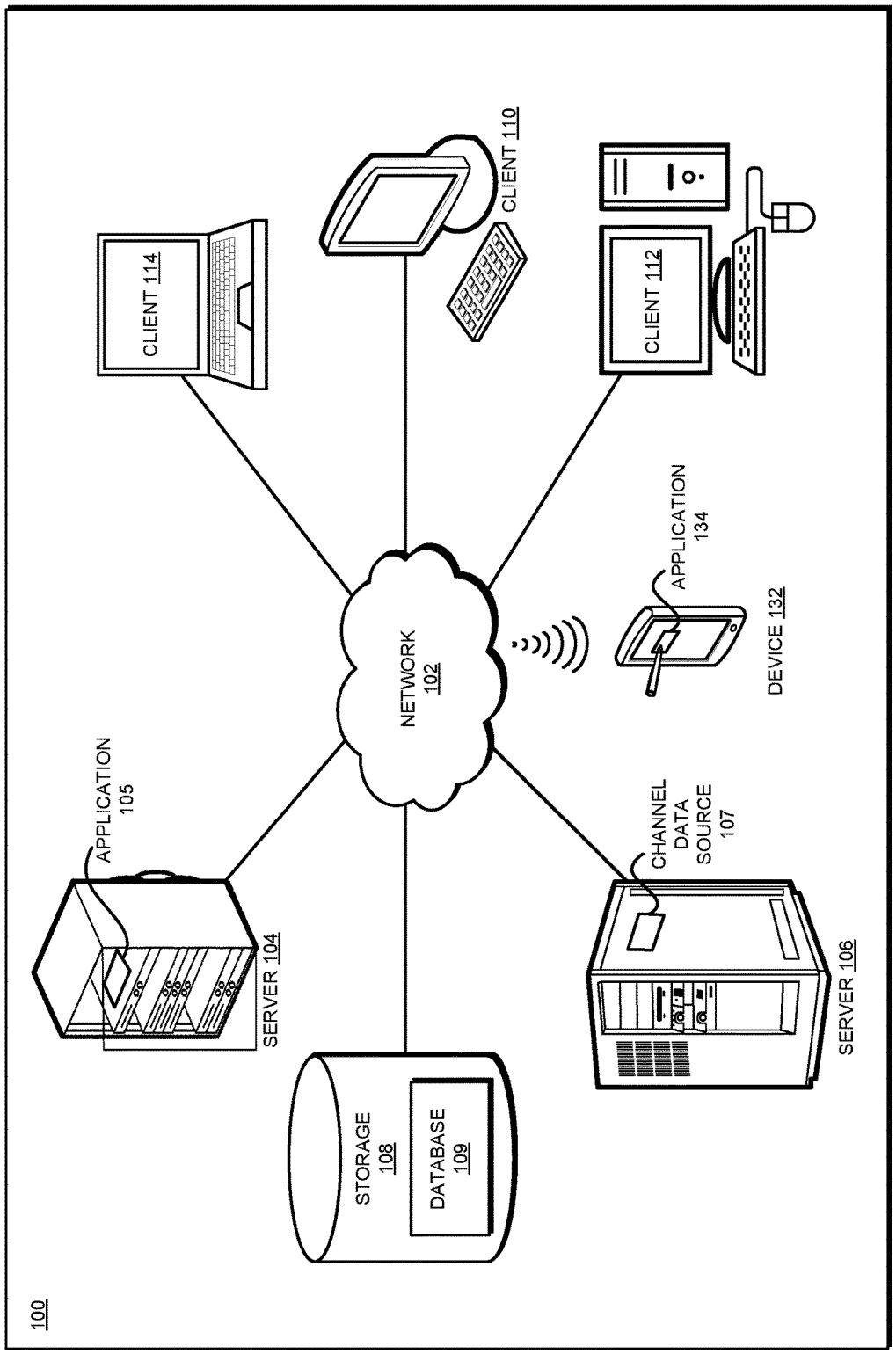
FIG. 1 depicts a block diagram of a network of data processing systems in which illustrative embodiments may be implemented.

It is generally desirable that a user post or send a message that is well-received by the target user or target channel. The illustrative embodiments recognize that on many occasions, a user realizes after sending a message that the tone of the message may not convey what the user wanted to convey. Similarly, on many occasions, a user realizes after sending a message that the target channel selected for the message may not be the correct channel. In many cases, a user may not even be sure which channel is suitable for the message the user wants to send.

The illustrative embodiments recognize that even when the target channel is known to or selected by a user, the user is often in the dark as to what is likely to be acceptable to people participating in the channel. The likely acceptability of a message in a channel relates to one or more message characteristics. For example, in some channels, a particular tone of the message may be liked, preferred, or welcome by the participants of the channel in a recent period. For example, a channel that largely used an informal tone of the message may adopt a more formal tone at some point in time. Similarly, a user in the channel may be a recognized authority on the topic in the channel and may get away with an opinionated tone of their messages whereas other users may not. As another example, a lecturing tone may be acceptable from an experienced user and not from a user of limited experience.

The illustrative embodiments recognize that the selection of appropriate channel and an appropriate tone in that channel becomes more challenging when the makeup of the channel is dynamic. For example, as described herein, a channel may adopt different tones or styles at different times. As another example, a channel may have different participants at different times, whose preferences, likes and dislikes, knowledge-levels about the topic, and many other factors correspondingly change from time to time.

Messaging in a public channel further exacerbates this problem. Because by nature, a public channel allows anyone from the public to join in the conversation or leave the conversation, the overall preference or likings in the channel as to the tone and sentiments of the messages can be highly dynamic. Thus, the illustrative embodiments recognize that while a user generally experiences the uncertainty about the appropriateness of the tone or the target channel of the user's message, such problems become pronounced in highly dynamic public channels.

The illustrative embodiments recognize that the presently available tools or solutions do not address these needs or provide adequate solutions for these needs. The illustrative embodiments used to describe the invention generally address and solve the above-described problems and other problems related to contextually and tonally enhanced channel messaging.

An embodiment can be implemented as a software application. The application implementing an embodiment can be configured as a modification of an existing messaging platform, as a separate application that operates in conjunction with an existing messaging platform, a standalone application, or some combination thereof.

A user typically uses a messaging client on a client device, which forms a client-side system in the messaging environment. The messaging platform uses a server system to which several client systems connect, and which facilitates the exchange of messages in the messaging platform. Such a server forms a server-side system. Furthermore, an embodiment described herein can be implemented entirely on a server-side system, entirely on a client-side system, or using a combination of a client and a server system such that some functions are implemented on the client-side and some on the server-side.

An embodiment analyzes a message that is to be posted by a user in a messaging platform. Particularly, the analysis of the message extracts a set of characteristics associated with the message. A language-processing system that is usable for determining a linguistic tone of the message is used in the analysis to determine a tone of the message as well.

If a target channel for the message is already selected by the user, an embodiment obtains a historical data that has been posted in the channel during a selected period in the past. One embodiment selects the past period according to a static period definition. Another embodiment selects the past period using a predefined period-selection rule. Another embodiment selects the past period using certain heuristics. For example, a first channel may be more dynamic than a second channel. According to one example heuristic, an embodiment selects a shorter and/or more recent past period in the first channel as compared to selecting a longer and/or more distant past period for the second channel.

An embodiment analyzes the past period data from the channel to determine the characteristics of the channel. For example, one embodiment identifies the message characteristics of the messages in the past period data. From those characteristics, then embodiment identifies those characteristics that appear more than a threshold number of times in the past period data. This example manner of determining a channel's characteristics is not intended to be limiting. From this disclosure, those of ordinary skill in the art will be able to conceive many other ways of determining a channel's characteristics and the same are contemplated within the scope of the illustrative embodiments.

In some cases, as in the example above, a channel's characteristics can be ascertained from the past period data. As another example, a channel's characteristic may be a characteristic that is preferred or liked by the channel users according to the messages in the past period data. For example, other channel users may prefer non-authoritarian tone of messages—a message characteristic—in the channel, and such a preference may be either expressly specified in the past period data or may be deduced from the analysis of the past period data.

In some other cases, a channel's characteristic may be determined from other channel-related data, in addition to, or in lieu of the past period data. For example, a channel's characteristic may be a characteristic—e.g. a topic—that is published in a channel profile, regardless of whether or not the sampling of messages in the past period data directly or indirectly relate to that characteristic. As another example, a channel's characteristic may be a characteristic specified in a message in the channel, regardless of whether or not the message is present in the past period data. A channel can have more than one characteristic.

An embodiment determines whether the characteristics of the message prepared by the user and the characteristics of the channel to which the message is to be posted have at least a threshold degree of match. If the threshold degree of match does not exist, the embodiment determines that the message is not suitable for the selected channel, and vice-versa.

A match exists if the set of message characteristics and the set of channel characteristics have at least a threshold-sized subset of characteristics in common. A match between a characteristic from the set of message characteristics and a characteristic from the set of channel characteristics can be, but need not be, exact. For example, two characteristics are said to match within the scope of the illustrative embodiments if they are linguistic or stylistic equivalents of one another, have the same or similar meanings, different references to the same thing, or otherwise known to be related to one another in a subject-matter domain.

If the message characteristics to not match the channel characteristics, one embodiment uses techniques such as Natural Language Processing (NLP), to recommend a change in the message. The change recommendation can be applicable to the tone characteristic of the message or to another characteristic of the message. The recommendation can be presented to the user in any suitable manner, including but not limited to highlighting some portion of the composed message—e.g., by color-coding or font-changing —and providing a suggestion relative to the highlighted portion.

One embodiment finds a channel, or an alternative channel if a target channel was already selected, where the composed message is likely to be appropriate. The process of channel selection according to the embodiment collects past period data of one or more other channels. The embodiment analyzes the past period data of the various channels to identify those other channels whose characteristics match the characteristics of the message as described herein. One or more other channels whose characteristics match the message characteristics are recommended as alternative channels where the message can be posted.

The recommendation of an alternative channel can be in addition to a user-selected target channel or in lieu thereof. Furthermore, the alternative channel recommendation can be presented to the user in any implementation-specific manner. As a non-limiting example, if the message has a data field where the target channel can be specified, one embodiment can insert a recommended alternative channel with a suitable highlight.

The manner of contextually and tonally enhanced channel messaging described herein is unavailable in the presently available methods. A method of an embodiment described herein, when implemented to execute on a device or data processing system, comprises substantial advancement of the functionality of that device or data processing system in enhancing a user's experience on messaging platforms, and particularly in improving the correspondence, preferences, and relevance between the messages and the channels to which the messages are posted.

The illustrative embodiments are described with respect to certain types of messages, messaging platforms, channels, message characteristics, channel characteristics, tones and styles, linguistic and grammatical characteristics, matching, analyses, preferences, likings, recommendations, manners of presentation, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
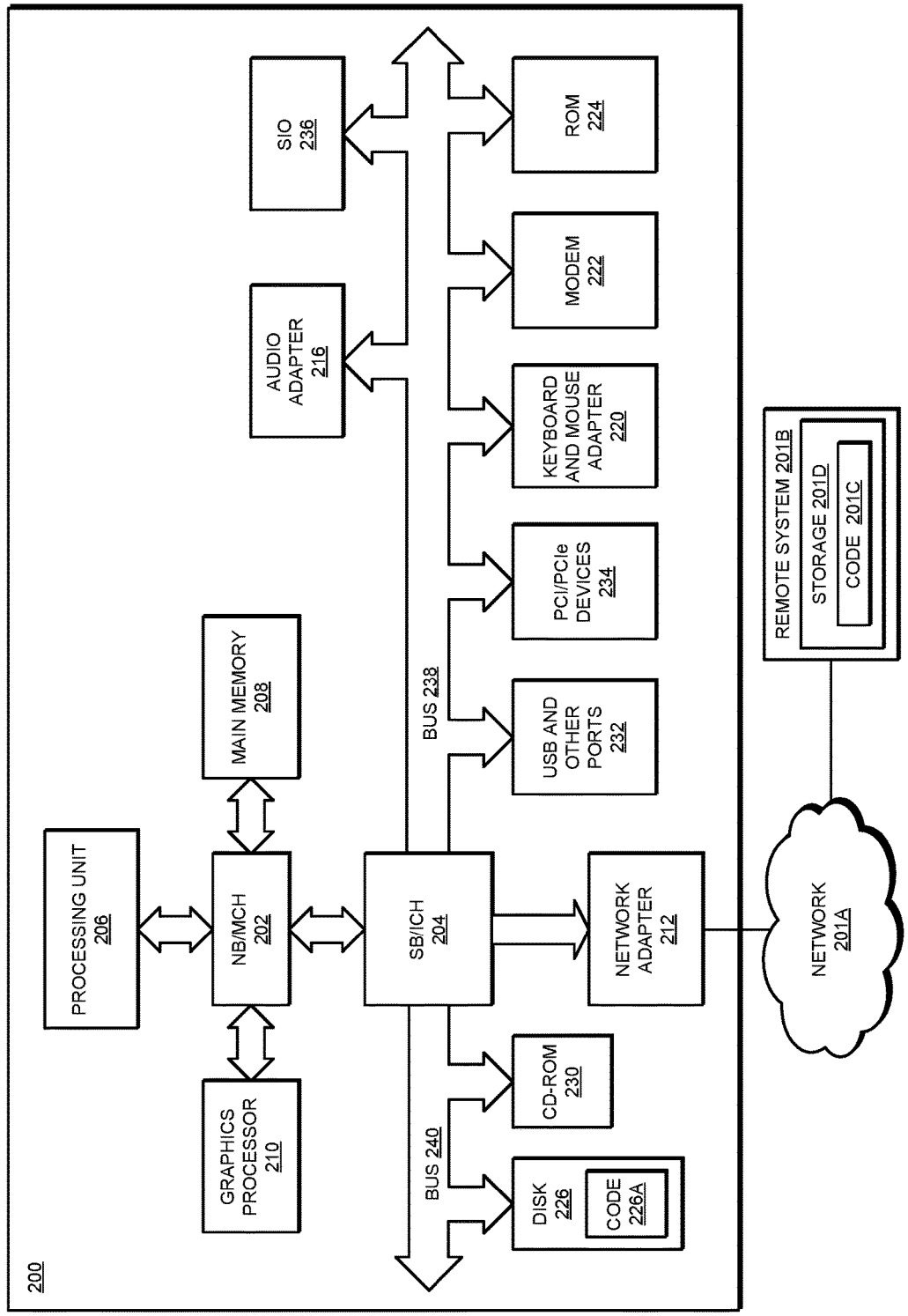
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 alone, application 134 alone, or applications 105 and 134 in combination implement an embodiment described herein. Channel data source 107 provides the past period data of the target channel or other channels in a manner described herein.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 and/or application 134 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2.

In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
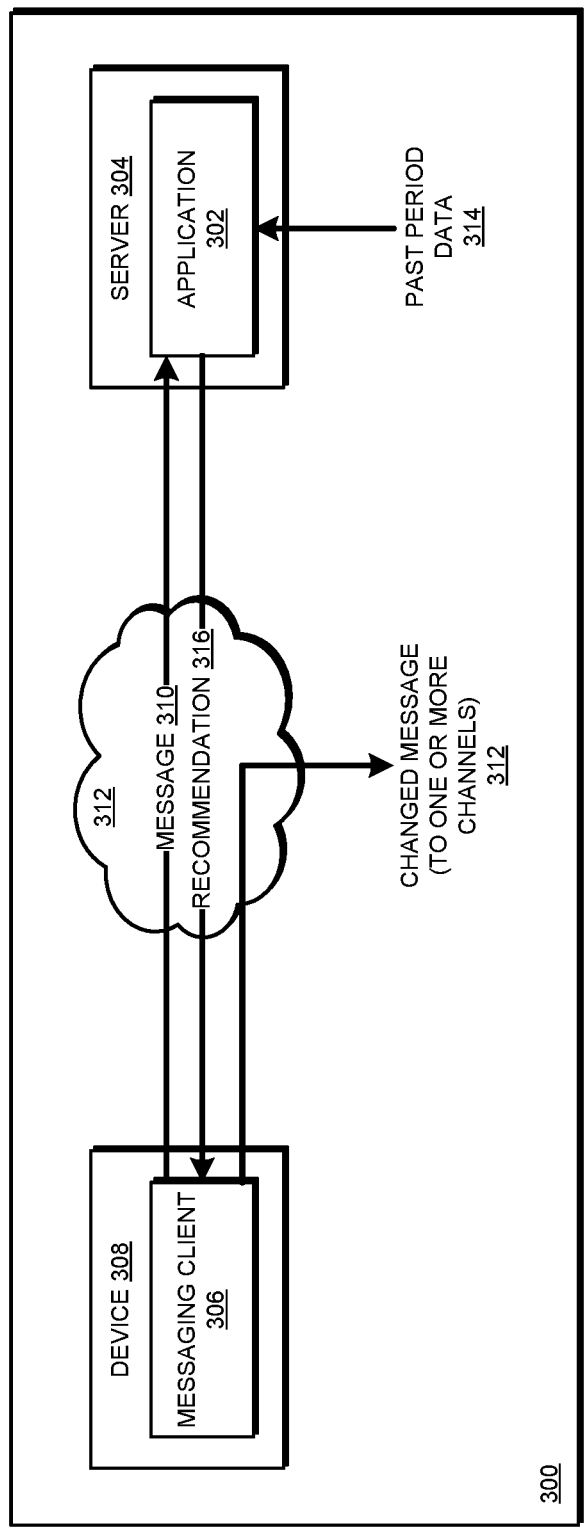
FIG. 3 depicts a block diagram of an example configuration for contextually and tonally enhanced channel messaging in accordance with an illustrative embodiment.

With reference to FIG. 3, this figure depicts a block diagram of an example configuration for contextually and tonally enhanced channel messaging in accordance with an illustrative embodiment. Application 302 is an example of application 105 in FIG. 1 and operates on the server-side of a given messaging platform as described herein, e.g., on server 304.

Messaging client 306 operates on device 308 on the client-side of the messaging platform. Device 308 is an example of device 132 or any of clients 110, 112, or 114 in FIG. 1.

A user composes message 310 using messaging client 306. Messaging client 306 sends message 310 over data network 312 to application 302 for analysis in a manner described herein. Network 312 is an example of network 102 in FIG. 1.

Application 302 selects a past period in a manner described herein. For the determined past period, application 302 obtains past period data 314 of one or more channels from one or more channel data sources such as source 107 in FIG. 1. In one example, message 310 already has a target channel identified. Accordingly, past period data 314 includes past period data of the target channel and optionally of one or more other additional channels. In another example, message 310 does not have a target channel identified therein. Accordingly, past period data 314 includes past period data of one or more other channels.

Application 302 analyzes message 310 to extract a set of message characteristics. Application 302 analyzes past period data 314 to determine a set of channel characteristics for each channel from which past period data 314 is obtained. Application 302 performs a matching operation between the set of message characteristics and the one or more sets of channel characteristics, as described herein.

Application 302 prepares and sends recommendation 316 to messaging client 306. According to one embodiment described herein, recommendation 316 includes a suggested change which should be applied to message 310 to construct changed message 318. According to another embodiment, recommendation 316 includes one or more suggested additional channels to which to post message 310—if message 310 does not have to be changed—or changed message 318 if recommendation 316 includes suggested changes for message 310, as the case may be.

Messaging client 306 presents recommendation 316 to the user, and constructs changed message 318 when applicable. Messaging client 306 posts message 310 or 318, as the case may be, to the identified target channel if applicable, one or more additional channels if applicable, or to some combination thereof.

Figure 4:
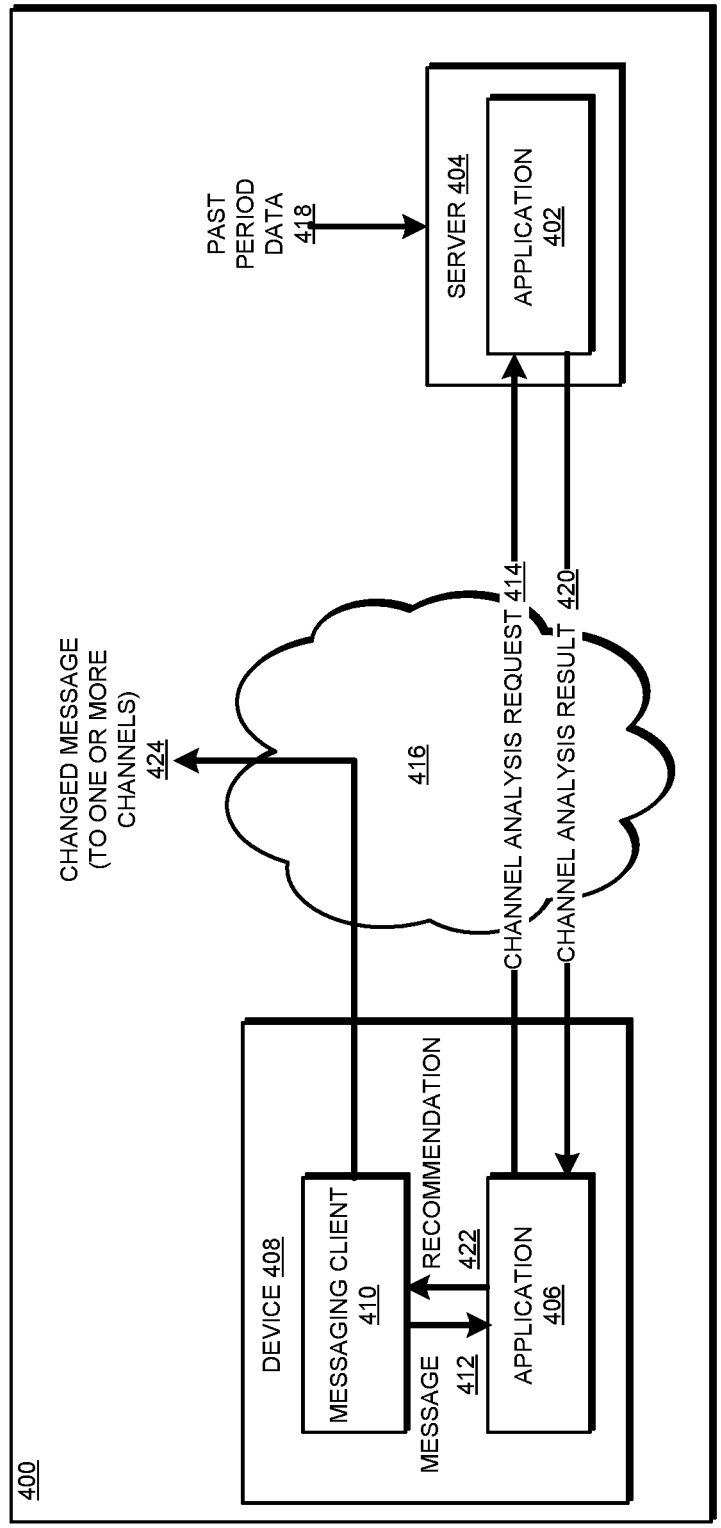
FIG. 4 depicts a block diagram of an example configuration for contextually and tonally enhanced channel messaging in accordance with an illustrative embodiment.

With reference to FIG. 4, this figure depicts a block diagram of an example configuration for contextually and tonally enhanced channel messaging in accordance with an illustrative embodiment. Application 402 is an example of application 105 in FIG. 1 and operates on the server-side of a given messaging platform as described herein, e.g., on server 404. Application 406 is an example of application 134 in FIG. 1 and operates on the client-side of a given messaging platform as described herein, e.g., on device 408. Device 408 is an example of device 132 or any of clients 110, 112, or 114 in FIG. 1. Messaging client 410 operates on device 408 on the client-side of the messaging platform.

A user composes message 412 using messaging client 410. Messaging client 410 sends message 412 to client-side application 406. Application 406 analyzes message 412 to extract a set of message characteristics. Application 406 sends channel analysis request 414 over data network 416 to application 402 for matching in a manner described herein. Network 416 is an example of network 102 in FIG. 1. Channel analysis request 414 includes a target channel identifier if a target channel has been selected by the user for message 412.

Application 402 selects a past period in a manner described herein. For the determined past period, application 402 obtains past period data 418 of one or more channels from one or more channel data sources such as source 107 in FIG. 1. If a target channel identifier is included in message 414, past period data 418 includes past period data of the target channel and optionally of one or more other additional channels. When message 414 does not include a target channel identifier, past period data 418 includes past period data of one or more other channels.

Application 402 analyzes past period data 418 to determine a set of channel characteristics for each channel from which past period data 418 is obtained. Application 402 performs a matching operation between the set of message characteristics from message 414 and the one or more sets of channel characteristics obtained from past period data 418, as described herein.

Application 402 prepares and sends channel analysis results 420 to application 406. Channel analysis results 420 include one or more of (i) recommended change for message 412 generally, (ii) recommended change for message 412 to be well-received at the selected target channel, and (iii)

additional channels where message 412 or a changed form thereof is likely to be well-received.

If channel analysis result 420 includes change recommendations for message 412, application 406 sends such recommendations as recommendations 422 to messaging client 410. If channel analysis result 420 includes identifier of one or more channels where message 412 or a changed form thereof should be posted, application 406 sends such recommendations also as a part of recommendations 422 to messaging client 410.

Messaging client 410 presents the suggested changes from recommendation 422 to the user. Messaging client 410 makes a change to message 412, forming changed message 424, if the user elects to make a message change recommended in recommendation 422. Messaging client 410 posts message 412 or 424, as the case may be, to the identified target channel if applicable, one or more additional channels from recommendation 422 if applicable, or to some combination thereof.

Figure 5:
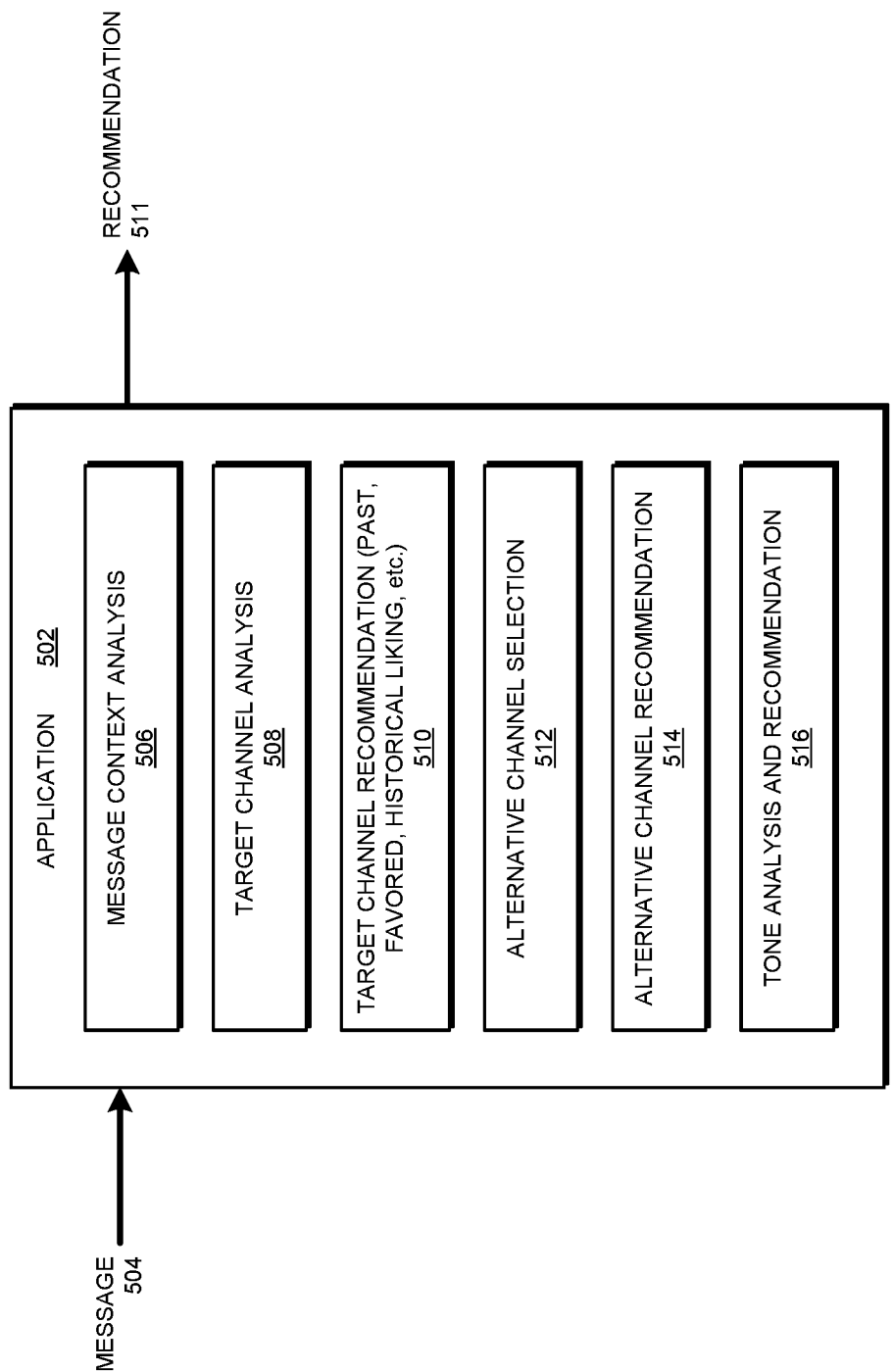
FIG. 5 depicts a block diagram of an example configuration for contextually and tonally enhanced channel messaging in accordance with an illustrative embodiment.

With reference to FIG. 5, this figure depicts a block diagram of an example configuration for contextually and tonally enhanced channel messaging in accordance with an illustrative embodiment. Application 502 can be implemented as application 302 in FIG. 3, or distributed and partially implemented in each of applications 402 and 406 in FIG. 4; accordingly, message 504 is an example of message 310 in FIG. 3 or message 412 in FIG. 4, respectively.

Component 506 analyzes message 504 to extract a set of message characteristics. When a target channel is specified, component 508 selects a past period suitable for the target channel. Component 508 collects a past period data that was posted during the selected past period in the target channel. Component 508 analyzes the past period data of the target channel to extract a set of channel characteristics, as described herein.

Component 510 performs a matching operation in a manner described herein to compute a recommendation. The recommendation may be all or a part of recommendation 511. The recommendation produced by component 510 include suggested changes to message 504, if any, according to the past-favored or previously liked characteristics of the target channel. Such suggested changes are selected by component 510 to improve the acceptability and increase a positive response to the message in the target channel when changed according to the suggestions.

If a target channel is not selected for message 504, or in addition thereto, component 512 selects additional channels where the message or the changed message, as the case may be, would be appropriate. For example, a channel may be known to have some channel characteristics which match some message characteristics to some degree, and that channel may be selected for analysis due to such preliminary matching. As another example, the user who composes message 504 may be active in some other channels, and those channels may be selected owning to the user's participation in them. Generally, a channel may be selected by component 512 for these and/or other reasons that will be apparent from this disclosure to those of ordinary skill in the art, and such reasons are contemplated within the scope of the illustrative embodiments.

Component 514 selects a past period suitable for a selected channel. Component 514 collects a past period data that was posted during the selected past period in the selected channel. Component 514 analyzes the past period data of the selected channel to extract a set of channel characteristics, as described herein.

Component 514 performs a matching operation in a manner described herein to compute a recommendation. The recommendation may be all or a part of recommendation 511. The recommendation produced by component 514 include an identifier of the selected channel, and suggested changes to message 504, if any, according to the past-favored or previously liked characteristics of the selected channel. Such suggested changes are selected by component 514 to improve the acceptability and increase a positive response to the message in the selected channel when changed according to the suggestions.

In this manner, any number of alternative channels can be processed by components 512 and 514. The data included in recommendation 511 changes accordingly.

Component 516 analyzes message 504, or even the changed message when created as described herein, for improving the linguistic desirability of the message. For example, component 516 analyzes a tone of communication conveyed by the message to a receiving user of the message. The result of the analysis causes component 516 to change the message or add change information to recommendation 511. Component 516 can similarly analyze and make or suggest for grammatical changes, sentiment changes, colloquialism or vocabulary-related changes, and many other changes that can increase the positive response towards the changed message in a channel in question.

Figure 6:
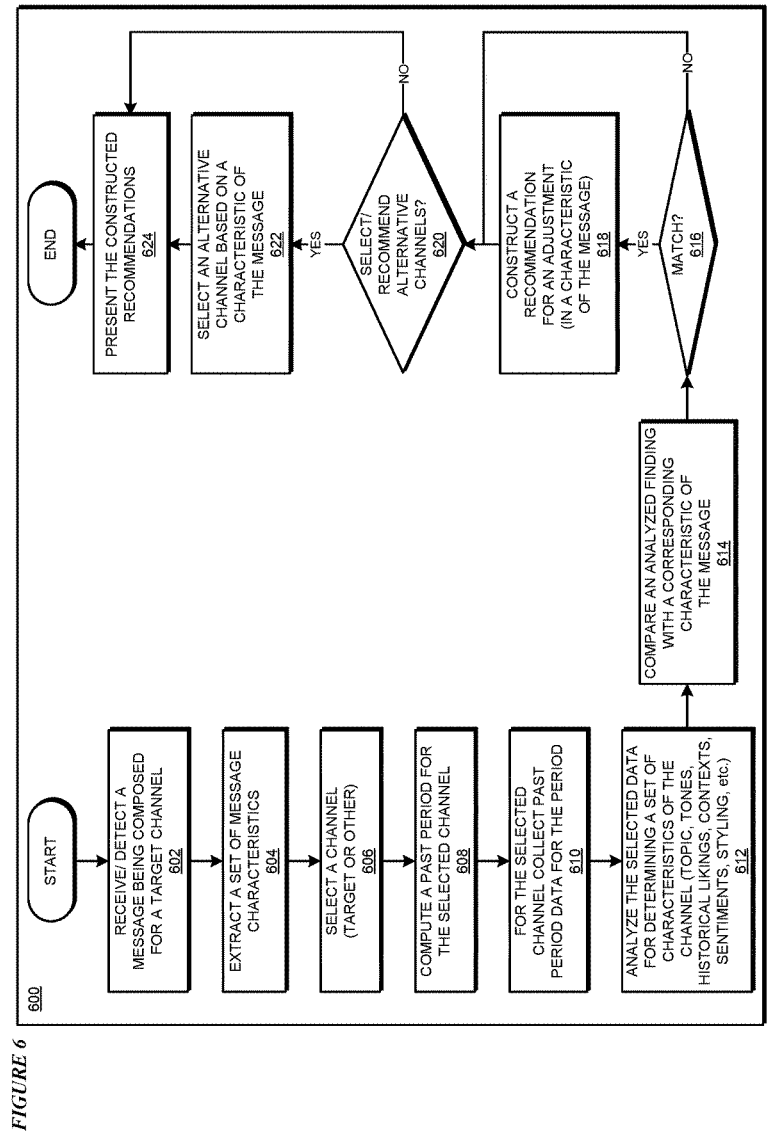
FIG. 6 depicts a flowchart of an example process for contextually and tonally enhanced channel messaging in accordance with an illustrative embodiment.

With reference to FIG. 6, this figure depicts a flowchart of an example process for contextually and tonally enhanced channel messaging in accordance with an illustrative embodiment. Process 600 can be implemented in application 502 in FIG. 5.

The application receives or detects a message that is being composed for posting on a messaging platform (block 602). The application extracts a set of message characteristics (block 604).

The application selects a channel for the message, e.g., a target channel if specified by the user or another channel selected in a manner described herein (block 606). For the selected channel, the application computes a suitable past period (block 608).

The application collects a past period data posted in the selected channel during the past period (block 610).

The application analyzes the selected past period data to determine a set of channel characteristics, e.g., topics related to the channel in the past period, tones accepted in the channel during the past period, historical likings and/or dislikes in the channel during the past period, contexts related to the channel in the past period, sentiments favored (towards a topic or context) the channel in the past period, stylings and tones preferred in the channel in the past period, and the like (block 612).

The application compares the set of message characteristics with the set of channel characteristics during the past period (block 614). The application determines whether the set of message characteristics match with the set of channel characteristics during the past period as described herein (block 616). If the sets do not match ("No" path of block 616), the application proceeds to block 620.

If the sets have at least a threshold degree of match ("Yes" path of block 616), the application constructs a recommendation for an adjustment in the message, an adjustment in a characteristic of the message, or both (block 618). The recommendation also includes an identifier of the selected channel if the selected channel is different from a target channel specified by the user.

The application determines whether to select and recommend additional alternative channels (block 620). If another channel is to be suggested ("Yes" path of block 620), the application selects an alternative channel in a manner described herein (block 622). The application returns to block 608 and proceeds therefrom for the selected alternative channel.

If no more channels are to be selected ("No" path of block 620), the application presents the recommendation constructed as a result of processing one or more channels in this manner (block 624). The application ends process 600 thereafter.

Thus, a computer implemented method, system or apparatus, and computer program product are provided in the illustrative embodiments for contextually and tonally enhanced channel messaging and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    analysing, using a processor and a memory, a message to extract a set of message characteristics, the message being constructed for posting on a messaging platform;
    computing, using the processor and the memory, for a channel on the messaging platform, a past period;
    extracting, using a processor and a memory, from a past period data posted in the channel during the past period, a set of channel characteristics;
    determining, using the processor and the memory, responsive to a threshold degree of match existing between the set of message characteristics and the set of channel characteristics, a characteristic that is different in the set of message characteristics from a corresponding characteristic in the set of channel characteristics, the corresponding characteristic in the set of channel characteristics being desirable in the channel; and
    constructing, using the processor and the memory, a recommendation comprising (i) a channel identifier of the channel to suggest posting the message in the channel, and (ii) a change to the message according to the corresponding characteristic in the set of channel characteristics, wherein the change to the message increases a degree of acceptability of the message in the channel.

2. The method of claim 1, wherein the change corresponds to a difference between a characteristic in the set of channel characteristic and a characteristic in the set of message characteristic.

3. The method of claim 1, wherein the channel is a target channel selected by the user, further comprising:
    selecting an alternative channel; and
    performing the computing, the extracting, and the constructing relative to the alternative channel.

4. The method of claim 3, further comprising:
    determining a set of channels on which a sender user of the message has participated; and
    selecting from the set of channels the alternative channel.

5. The method of claim 3, further comprising:
    evaluating that the alternative channel comprises at least one characteristic that is present in the set of message characteristics, the selecting being responsive to the evaluating.

6. The method of claim 1, wherein the set of channel characteristics comprises a communicative tone preferred in the channel during the past period.

7. The method of claim 1, wherein the set of channel characteristics comprises a preferred sentiment towards a topic in the channel during the past period.

8. The method of claim 1, further comprising:
    determining a rate of change in a user group of the channel;
    determining a second rate of change in a second user group of a second channel on the messaging platform; and
    selecting, as a part of computing the past period, responsive to the rate exceeding the second rate, a first period as the past period of the channel, the first period being shorter than a second period of the second channel.

9. The method of claim 1, further comprising:
    determining a rate of change in a user group of the channel;
    determining a second rate of change in a second user group of a second channel on the messaging platform; and
    selecting, as a part of computing the past period, responsive to the rate exceeding the second rate, a first period as the past period of the channel, the first period being closer to a present time relative to a second period of the second channel.

10. The method of claim 1, further comprising:
    determining a rate of change in a context of the channel;
    determining a second rate of change in a context of a second channel on the messaging platform; and
    selecting, as a part of computing the past period, responsive to the rate exceeding the second rate, a first period as the past period of the channel, the first period being shorter than a second period of the second channel.

11. The method of claim 1, wherein a message characteristic in the set of message characteristics comprises a communicative tone of the message that is conveyed by the message to a recipient of the message.

12. The method of claim 1, wherein a message characteristic in the set of message characteristics comprises a linguistic styling of the message that is conveyed by the message to a recipient of the message.

13. The method of claim 1, wherein a message characteristic in the set of message characteristics comprises a sentiment of a sender of the message that is conveyed by the message to a recipient of the message.

14. The method of claim 1, wherein the past period is specific to the channel.

15. A computer usable program product comprising one or more computer-readable storage devices, and computer usable code stored on at least one of the one or more storage devices, the stored computer usable code comprising:
    program instructions to analyze a message to extract a set of message characteristics, the message being constructed for posting on a messaging platform;

program instructions to compute, for a channel on the messaging platform, a past period;

program instructions to extract, from a past period data posted in the channel during the past period, a set of channel characteristics;

program instructions to determine, responsive to a threshold degree of match existing between the set of message characteristics and the set of channel characteristics, a characteristic that is different in the set of message characteristics from a corresponding characteristic in the set of channel characteristics, the corresponding characteristic in the set of channel characteristics being desirable in the channel; and program instructions to construct a recommendation comprising (i) a channel identifier of the channel to suggest posting the message in the channel, and (ii) a change to the message according to the corresponding characteristic in the set of channel characteristics, wherein the change to the message increases a degree of acceptability of the message in the channel.

16. The computer usable program product of claim 15, wherein the change corresponds to a difference between a characteristic in the set of channel characteristic and a characteristic in the set of message characteristic.

17. The computer usable program product of claim 15, wherein the channel is a target channel selected by the user, further comprising:

program instructions to select an alternative channel; and program instructions to perform the computing, the extracting, and the constructing relative to the alternative channel.

18. The computer usable program product of claim 15, wherein the computer usable code is stored in the one or more computer-readable storage devices in a data processing system, and wherein the computer usable code is transferred over a network from a remote data processing system.

19. The computer usable program product of claim 15, wherein the computer usable code is stored in the one or more computer-readable storage devices in a server data processing system, and wherein the computer usable code is downloaded over a network to a remote data processing system for use in a computer readable storage device associated with the remote data processing system.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to analyze a message to extract a set of message characteristics, the message being constructed for posting on a messaging platform;

program instructions to compute, for a channel on the messaging platform, a past period;

program instructions to extract, from a past period data posted in the channel during the past period, a set of channel characteristics;

program instructions to determine, responsive to a threshold degree of match existing between the set of message characteristics and the set of channel characteristics, a characteristic that is different in the set of message characteristics from a corresponding characteristic in the set of channel characteristics, the corresponding characteristic in the set of channel characteristics being desirable in the channel; and program instructions to construct a recommendation comprising (i) a channel identifier of the channel to suggest posting the message in the channel, and (ii) a change to the message according to the corresponding characteristic in the set of channel characteristics, wherein the change to the message increases a degree of acceptability of the message in the channel.

* * * * *